March 18, 1930.   L. ROUANET   1,750,904
BRAKE OPERATING DEVICE FOR MOTOR VEHICLES
Filed March 9, 1925    3 Sheets-Sheet 1
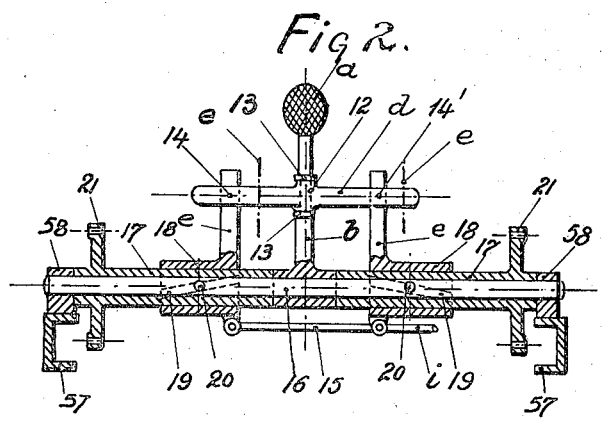
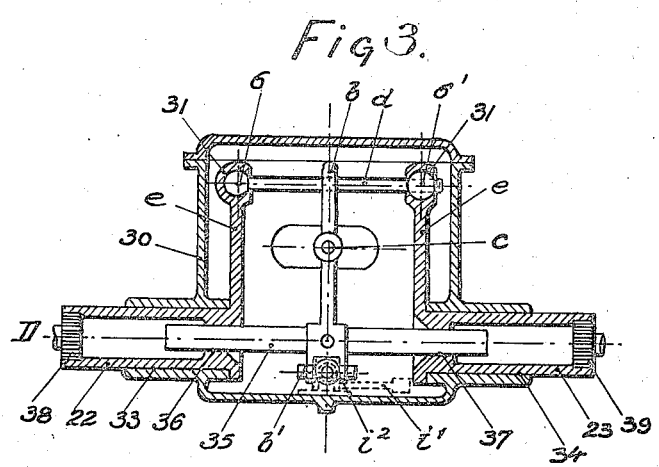
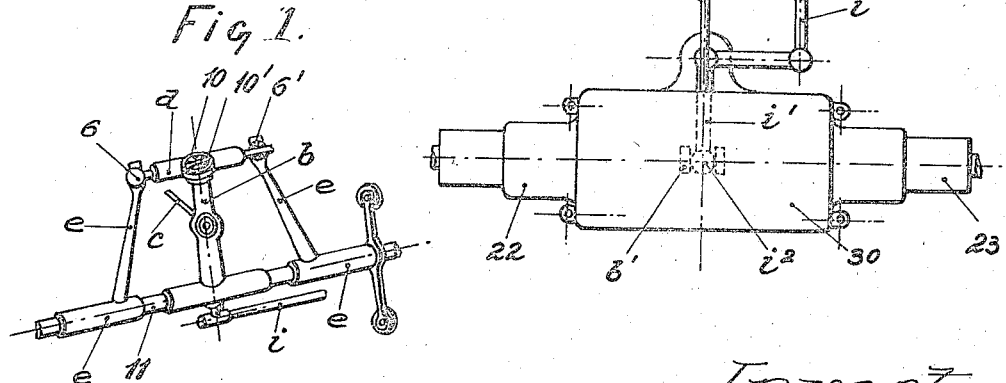
Inventor
L. Rouanet
by Marks & Clerk
Attys.

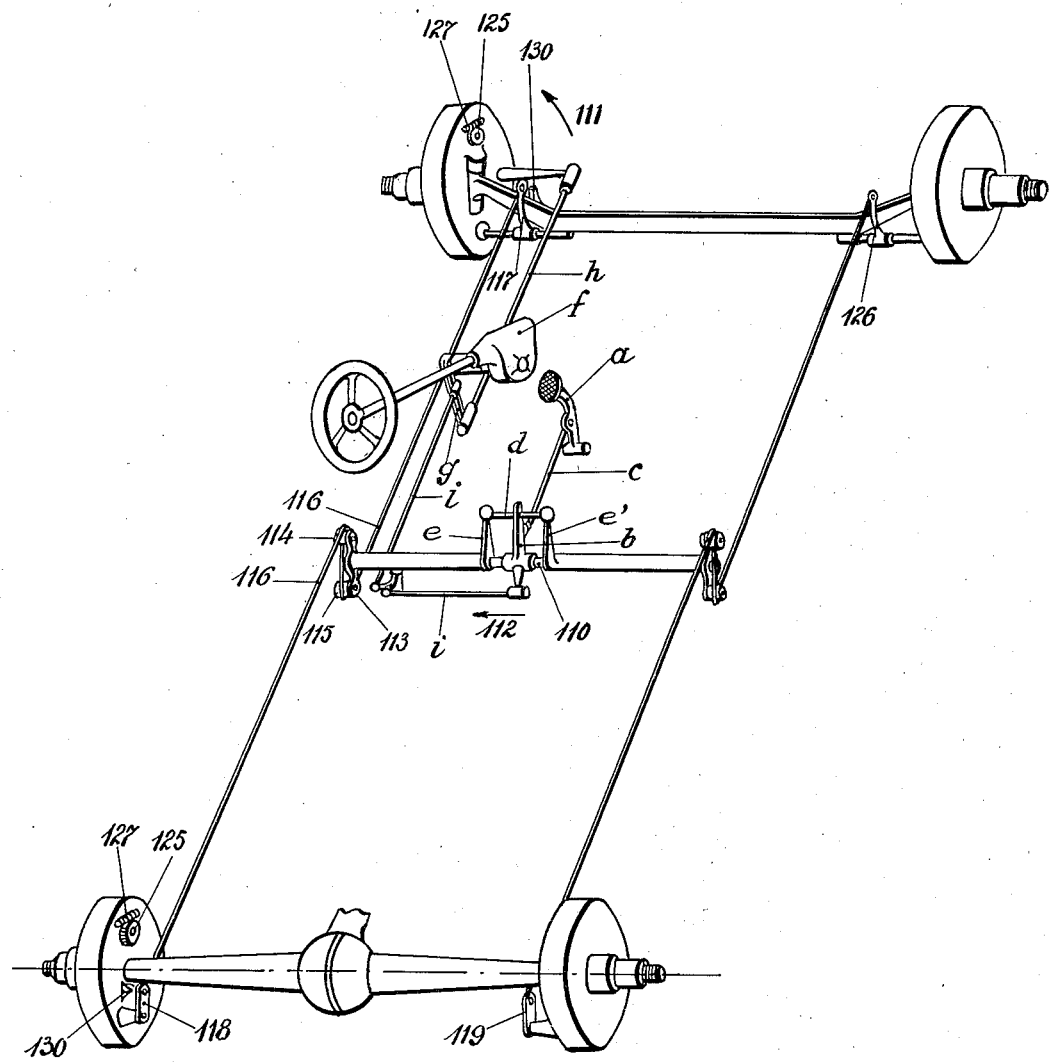

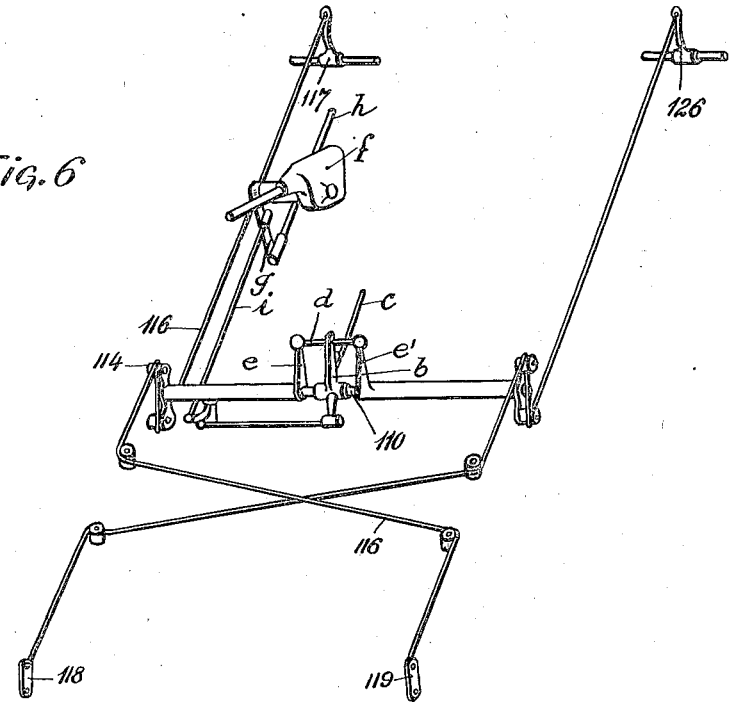
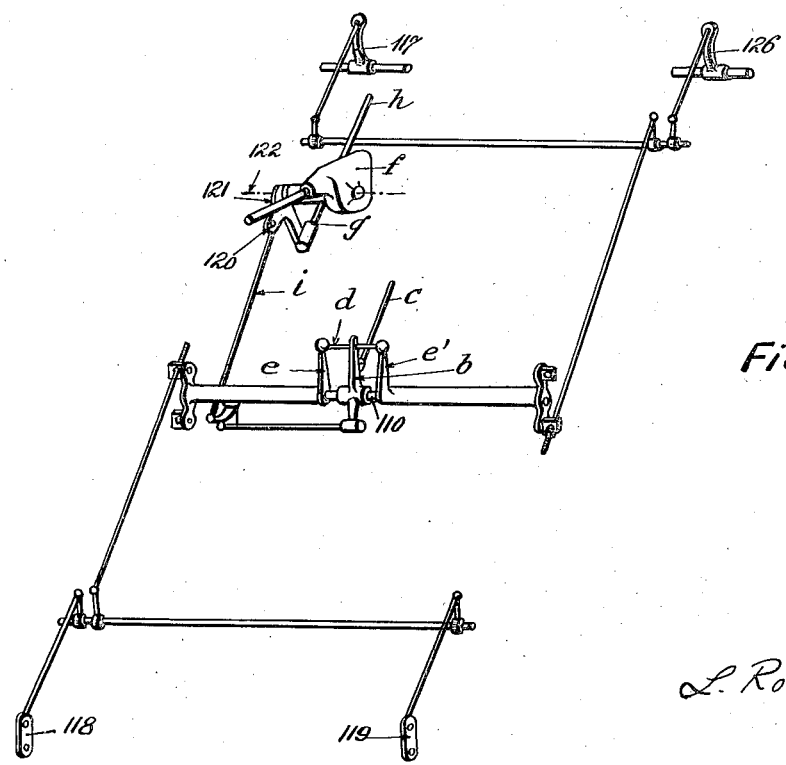

Patented Mar. 18, 1930

1,750,904

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY

BRAKE-OPERATING DEVICE FOR MOTOR VEHICLES

Application filed March 9, 1925, Serial No. 14,255, and in France March 21, 1924.

The present invention relates to a brake operating device, which is applicable to all known brake systems for steering and driving axles, and which effects automatically an equal distribution of the braking force applied, between each of the steering and driving wheels during the running in straight line of the vehicle, as well as a differential division of this force when the vehicle traverses a curve.

The said device, in which the initial action producing the braking movement acts, under the control of the steering mechanism of the vehicle, on a special arrangement by which it is suitably distributed upon each of the wheels, is characterized in that it comprises in combination: a primary member receiving the brake pull from a pedal, a lever, an auxiliary motor, etc.; two secondary members transmitting the brake pull to the wheels or to groups of wheels; and an intermediate member which, under certain conditions divides the brake pull received from the primary member between the secondary members.

The conditions of distribution, controlled by the steering mechanism of the vehicle, may be modified by moving one of the constituent members of the special arrangement, either the intermediate member or the primary member receiving the brake pull, or also by displacement of the secondary members.

The system may be arranged in various ways, so that the effect of the steering movements will act: either to distribute the braking force, differentially on each of the secondary members; or to reduce the action upon one of the secondary members; or also to reduce the force on each of the secondary members; the distribution in this latter case being equal or different on each of the said members.

The system may be combined with the parts of the brake operating device that acts on the wheels, in such a manner that each of the secondary members controls the braking action for a group of two wheels, (the group of wheels situated on one side of the vehicle, the group of wheels diagonally disposed, the group of the front wheels or the group of the rear wheels).

The operation of one, or other of said different groups of wheels, by one secondary member, may be carried out in any suitable manner. Obviously, each of the secondary members may also act on a single wheel.

The invention is further characterized by the combination, in a motor vehicle, of the distributing system above referred to with brake operating mechanisms associated with each group of wheels, and adjusting or controlling devices mounted on each of the brakes and acting on the brake shoes against the action of the operating cams so as to permit to take up the wear at the points where it is produced, so that the most favourable positions of the constituent members of the distributing system may be automatically maintained without modifying the original position of the operating pedal, or the equivalent member, and of the interposed members.

The invention will be better understood with reference to the accompanying drawings, annexed as examples, and in which:

Fig. 1 is a perspective diagrammatic view showing an arrangement in which the conditions of distribution are modified by moving the primary member;

Fig. 2 is a diagrammatic view of an arrangement according to which the conditions of distribution may be modified by relative movement of the secondary members.

Fig. 3 is a longitudinal section through a mechanical arrangement according to Fig. 1.

Fig. 4 is a corresponding plan view.

Fig. 5 is a perspective diagrammatic view of a distributing system arranged on the underframe of a motor vehicle and combined with devices for taking up the play and operated from the exterior.

Figs. 6 to 7 inclusive show alternative forms of the same arrangement.

In the drawings, a (Fig. 2) designates the member which is actuated to operate the brakes. b designates the primary member which may be either formed integral with the member a or controlled by the latter through the intermediary of any suitable member *c*. *d* designates the intermediate distributing member, acting as a beam on the secondary members *e* through which the braking force is transmitted.

Referring to Fig. 5, *f* designates the steering device of the vehicle and *g* the steering lever which effects simultaneously: the steering movements of the wheels through the intermediary of a steering member *h*, and also effects, through the intermediary of a rod *i*, a modification of the division of the braking force.

In Fig. 1, the intermediate distributing member *d* is connected to knuckles 6 and $6^1$ provided on the secondary members *e* which are in turn pivoted to a shaft 11.

The primary member *b* is so arranged that it may be moved longitudinally along the said shaft 11 by means of the rod *i*. The angular movements of member *a* (not shown), on which the initial braking force is applied, are transmitted to the primary member *b* through the intermediary of the brake rod *c*.

The operation of this arrangement is as follows:

The braking force applied at *a* is transmitted to the intermediate member *d* at 10 through the intermediary of the primary member *b*. The position of the point 10, relative to the knuckles 6 and $6^1$ is controlled by the position of the rod *i* in such a manner that, when the vehicle is travelling in a straight line, the distance 6—10 is the same then as the distance $6^1$—10, so that the total braking force is equally divided between each of the knuckles 6 and $6^1$, whereby the action of each of the secondary members *e* will be the same. For this purpose, the primary member *b* is moved longitudinally along the shaft 11 under the control of the steering rod *i* connected to the steering gear mechanism, as will be readily understood from the inspection of Fig. 1.

On curves the member *b* is moved along the shaft 11 and according to the direction of travel of the vehicle, the point 10 is caused to move towards one or other of the knuckles 6 or $6^1$, the total braking force being then unequally distributed upon each of the said knuckles, whereby the action on each of the secondary members is no longer equal.

The difference is used to obtain a differential braking action on the wheels or groups of wheels on the vehicle, the differential effect being obviously proportional to the angular value of the steering movement.

To prevent frictions during said displacement, the bearing part of the member *b* may be formed as a roller or as a ball bearing $10^1$.

In Fig. 2, according to which the conditions of distribution are modified on curves by the displacement of the secondary members (instead of being modified by the displacement of the primary member as in Fig. 1) the general arrangement of the device is as follows: The intermediate member *d* is pivotally connected at 12 to the primary member *b* which, for this purpose, is provided with two lugs 13. The brake rods are adjusted so that, when the vehicle moves in a straight line, the bearing points 14 and $14^1$, of each of the secondary members *e* upon the intermediate member *d*, are situated at the same distance from the pivoting axis 12, so that the effect of each of the said secondary members *e* will be the same.

On curves, and for a given direction of steering, the steering rod *i*, is actuated by the steering mechanism and moves the secondary members *e*, suitably connected together by means of a rod such as 15, into the positions indicated in dot and dash lines. For said positions the distance 12—$14^1$ is increased whilst the distance 12—14 is reduced with the same amount, whereby the actions of the members *e* are no longer the same.

In order to compensate for any abnormal angular movements of the secondary members *e*, caused by the elongations of the links, rods, etc., and which may occur in connection with the group of wheels on which the greatest braking force is applied, the said secondary members *e* may be mounted in a special manner hereafter indicated.

The cylindrical rod 16, on which the primary member *b* is pivoted, is secured to the underframe 57 of the vehicle. On the said rod 16 are also supported the secondary members *e* formed of two parts concentric with each other and with the rod 16. The part of each of the secondary members directly surrounding the cylindrical rod 16, and designated by reference 17, is disposed between the primary member and a stop 58, so as to prevent any longitudinal movement along the said rod 16.

The external part of each of the members *e*, which is concentric with the corresponding part 17, is designated by the reference 18. This part 18 forms a bushing provided, on its inner face, with a helical groove 19 of suitable pitch, in which is engaged a pin 20 integral with the part 17.

It will be readily understood that the longitudinal displacement of each of the bushings 16, under the action of the steering rod *i* may cause a relative rotatory movement of the corresponding part 17, the latter being suitably connected at 21 to the brake operating members.

The pitch of the helical groove 19 being suitably designed, and so as to allow for the difference of pressure on the secondary members *e*, resulting from a certain longitudinal displacement thereof, and for the flexibility of the members *e*, of the brake rods interposed between the members *e* and the brake members proper, and also of the underframe of the vehicle, exact balance may be obtained. By this arrangement, the angular displacement or angle of lag of the members $e$ only depends on the differences in adjustment, without being affected by the differential braking action, the operation of the device being thus practically perfect.

It will be understood that this latter arrangement may be applied to all the brake operating devices covered by the invention, because, when the members $e$ are laterally guided, it will be sufficient to actuate, through the intermediary of the steering rod $i$, an equivalent device suitably arranged between the members $e$ and the operating levers of the brakes.

In Figs. 3 and 4 which illustrate, respectively in elevation and plan, a mechanical arrangement according to Fig. 1, the distributing system enclosed in a casing 30 secured on the underframe of the vehicle (not shown) is arranged as follows: The intermediate distributing member $d$ is suitably supported on the secondary members $e$ with each of its spherical ends 6 and $6^1$ held in a ball socket 31 of the corresponding secondary member $e$. The secondary members $e$ themselves are supported by the casing 30, in the inside of which they are adapted to rotate, as shown at 33 and 34, and to this end, they are provided with bushings 22 and 23 mounted inside the journals 33 and 34 of the casing 30.

The two bushings 22 and 23 are mounted in line with each other on the same axis D—D along which a shaft 35 is adapted to move, said shaft being suitably guided at 36 and 37 inside the bushings 22 and 23.

The primary member $b$ receives the initial braking strain through the intermediary of the brake rod $c$, and it is moved together with the shaft 35 along the axis D—D, through the intermediary of the rod $i$ acting, for this purpose, on a pivoted lever $i^1$, the spherical end $i^2$ of which slides in a forked part $b^1$ of the primary member $b$. The equal or differential action resulting from such movement and transmitted as above explained to each of the members $e$, is in turn transmitted by the said latter member and through the intermediary of toothed parts 38 and 39 formed inside the bushings 22 and 23, to the brake rods of the wheels to be braked.

In Fig. 5, the distributing device of the braking force is diagrammatically illustrated in position on the frame of a motor vehicle having brakes on the four wheels. The distributing device is of the kind illustrated in Fig. 1.

The braking force applied to the pedal $a$ is transmitted to the primary member $b$ through the brake rod $c$. The primary member is adapted to slide along a stationary shaft 110, under the control of the steering rod $i$ connected to the lever $g$ of the steering gear mechanism $f$. The member $b$ divides the total braking force between the secondary members $e$ and $e^1$. The rod $i$ is so arranged and adjusted that the braking force will be equally divided when the vehicle is moving in a straight line, and differentially divided when the vehicle is moving on curves.

Assuming that the vehicle is turned in the left hand direction, as shown by the arrow 111, the primary member $b$ is then moved in the direction of the arrow 112, which causes an increased action on the secondary member $e$ and a reduced effort by the same amount of the secondary member $e^1$.

According to the example illustrated, the member $e$ is provided with a double lever 113, having rollers 114 and 115 on which passes the string 116, the latter being connected, on one end, to the operating lever 117 of the front-left brake and, on the other end, to the operating lever 118 of the rear-left brake, whilst the member $e^1$ is provided with the same mechanical parts acting in the same way on the group of brakes situated at the right hand side of the vehicle.

The arrangement of the string 116 and rollers 114 and 115 serves to effect in a proportional manner, the automatic division of the braking force of the secondary member $e$ between the levers 117 and 118, the values of the braking force at the front and at the rear of the vehicle being preferably such that they correspond to the maximum gripping power of the front and rear wheels respectively.

When the vehicle is turned to the left, as already described, the total braking force of the group of wheels that describe the smaller arc is thus increased, the relative braking forces applied to each of the front and rear wheels remaining properly proportioned, owing to the employment of the system 113—114—115, whilst the total braking force applied to the group of wheels that describe the arc of greater radius is reduced with the same quantity. Of course, the arrangement may act in a manner reverse to that just described.

The string 116 of the member $e$ may also be connected, through the intermediary of suitable transmission elements, on the one hand to the front left brake 117 and, on the other hand to the right rear brake 119, the member $e^1$ acting in such a case on the other group of wheels (front-right wheel and rear-left wheel) as illustrated in Fig. 6.

The string 116 may also be disposed in any suitable manner so as to actuate the two front brakes, whilst the string of the secondary member $e^1$ would then act on the two rear brakes, or vice versa (Fig. 7).

In this latter case, which refers to the braking by front and rear groups, the steering member $i$ must be so connected to the steering mechanism that, for any direction of steering, the primary member $b$ will be moved on the same side to the benefit of the same secondary member, which may be that controlling the front, or the rear group of wheels on which it is desired to obtain the strongest braking action. When the vehicle moves in a straight line, the primary member $b$ will act on the intermediate member $d$ in such a manner as to divide, according to a given proportion, the total braking force between the members $e$ and $e^1$, and, preferably, so that the braking on the front or rear group of wheels should be proportioned to the gripping of the wheels on the ground.

When the vehicle is turned either to the right or to the left, the displacement of the primary member $b$ will reduce the braking action upon one of the groups of wheels to the benefit of the other group.

To effect the displacement of the member $b$ in the same direction during steering movements to the right or to the left, the rod $i$ may for example be connected (Fig. 7) as shown at 120, to a lever 121, which is integral with the steering lever $g$, in such a manner that, during movements of the vehicle in a straight line, the point 120 is spaced a maximum distance from the pivoting axis 122 of the steering lever $g$, the steering movements, in any direction, having thus the effect of exerting a pull on the steering rod $i$.

It will be understood that all the particular arrangements, above described, of groups of wheels, steering device, and braking rods may be combined with any of the mechanical arrangements described.

The invention also relates to the automatic division between any and all of the brakes, and this always in proper proportion, of the braking force applied at $a$, and this in spite of differences resulting from play between or bad adjustments in the interposed brake rods. However, when the play becomes too great, it may cause a considerable angle of lag between the secondary members $e$ and $e^1$, sufficient to prevent the operation of the distributing device. Under such conditions the intermediate member $d$ may assume an abnormally inclined position, which may interfere with the displacement of the primary member $b$.

To overcome this disadvantage, and at the same time to insure that the operation of the brakes shall remain constant (which is an absolute necessity for the operation of the distributing member), the brake system is combined (Fig. 5) with adjusting devices 125 acting individually, and in any desirable manner to take up the play of the brake shoes of each wheel by spacing apart the enclosed parts of each brake against the action of the operating levers 117, 118, 119 and 126, and in such a manner that, by only actuating the members 125, the initial positions of the members 117, 118, 119 and 126, and consequently that of all the members or parts of the distributing device, as well as that of the point of application of the braking force may be restored.

To render such adjustment practical, the members 125 may for example be operated by means of nonreversing screws 127 disposed outside the brake drums. In this manner, instantaneous and accurate adjustment may be easily effected on a finished vehicle without having to touch the enclosed members (steering members, distributing member and pedal) to which access is difficult.

To avoid taking up the play produced on one of the rear wheels by acting on the adjusting device 125 of a front wheel, (which may occur owing to the fact that the wheels are connected together, by the brake rods), and also in order that the elimination of the play may be equal on each side of the vehicle, so as to rectify any possible angle of lag between the members $e$ and $e^1$, indicating marks or the like 130, are provided on the fixed parts of the brake drums, or on the vehicle axles, opposite the levers 117, 118, 119 and 126, to indicate the normal positions of the said levers.

Thus, when, owing to the play, the pedal $a$ reaches the end of its travel, it will be sufficient to actuate the adjusting members 125, in such a manner that, for a given amount of tightening, the four above mentioned levers are restored to their initial positions, indicated by the marks 130.

As there may be a considerable amount of play in the brake rods, indicated marks may also be provided on the casing of the distributing device, or on any other fixed parts, to indicate the normal positions of the members of the said device, corresponding to the normal positions of the levers 117, 118, 119 and 126.

By the provision of the said adjusting devices, it is a simple matter to adjust all the elements of an old vehicle in their correct position, technically determined originally without previous trial and without errors.

Claims:

1. A brake device arrangement comprising a main brake operating member, a primary member connected therewith and operated thereby, a shaft and said primary member pivoted on said shaft, an intermediate member, two secondary brake operating members disposed on either side of the primary member and also pivoted on the shaft, and means controlled by the steering mechanism and adapted to modify the relative positions of the primary and secondary members along the shaft on either side of the position of the said members corresponding to the straight running of the vehicle.

2. A brake device arrangement comprising a main brake operating member, a primary member connected therewith and operated thereby, a shaft, the primary member pivoted on said shaft, sleeves surrounding the shaft on either side of the primary member, levers on the sleeves and said levers connected together in predetermined relative positions, an intermediate member, the primary member acting on the intermediate member and the intermediate member acting on the levers, brake shoe operating members connected to said levers, and means controlled by the steering mechanism and adapted to modify the relative positions of the primary member and the levers along the shaft on either side of the position of the said members corresponding to the straight running of the vehicle.

3. The combination with a brake device arrangement as claimed in claim 2, marks associated with the brake shoe operating members.

LOUIS ROUANET.